(12) United States Patent
Brouwer

(10) Patent No.: US 8,197,077 B2
(45) Date of Patent: Jun. 12, 2012

(54) DRIVE SYSTEM, DRIVE MODULE AND REARVIEW MIRROR UNIT FOR A MOTOR VEHICLE

(75) Inventor: Stefan Frits Brouwer, Schoonhoven (NL)

(73) Assignee: MCI (Mirror Controls International) Netherlands B.V., Montfoort (NL)

( * ) Notice: Subject to any disclaimer, the term of this patent is extended or adjusted under 35 U.S.C. 154(b) by 871 days.

(21) Appl. No.: 12/090,615

(22) PCT Filed: Oct. 18, 2006

(86) PCT No.: PCT/NL2006/000528
§ 371 (c)(1),
(2), (4) Date: Nov. 4, 2008

(87) PCT Pub. No.: WO2007/046695
PCT Pub. Date: Apr. 26, 2007

(65) Prior Publication Data
US 2009/0219637 A1     Sep. 3, 2009

(30) Foreign Application Priority Data
Oct. 18, 2005   (NL) .................................. 1030221

(51) Int. Cl.
*G02B 7/182* (2006.01)

(52) U.S. Cl. ...................................................... 359/874

(58) Field of Classification Search .................. None
See application file for complete search history.

(56) References Cited

U.S. PATENT DOCUMENTS

| | | | |
|---|---|---|---|
| 4,828,453 A | 5/1989 | Martin et al. | |
| 5,672,924 A | 9/1997 | Wallace et al. | |
| 5,835,291 A * | 11/1998 | Takayama | 359/843 |
| 6,084,373 A | 7/2000 | Goldenberg et al. | |
| 6,454,624 B1 | 9/2002 | Duff et al. | |
| 2005/0141115 A1 * | 6/2005 | Foote et al. | 359/879 |

FOREIGN PATENT DOCUMENTS

| | | |
|---|---|---|
| EP | 0287181 A2 | 10/1988 |
| EP | 1287869 A2 | 3/2003 |
| JP | 20021060188 | 6/2002 |
| JP | 2005167943 A | 6/2005 |
| WO | WO98/46451 A1 | 10/1998 |

* cited by examiner

*Primary Examiner* — Jennifer L. Doak
(74) *Attorney, Agent, or Firm* — Dykema Gossett PLLC

(57) ABSTRACT

A modular drive system, in particular for a driven angular adjustment of a rearview mirror support of a motor vehicle, comprising at least two drive modules, each provided with a housing with an electric motor and a drive portion driven by the electric motor, and a drivable portion for cooperation with a drive portion of another drive module, further comprising coupling means for attaching two drive modules to each other with one rotational degree of freedom by cooperation of a drive portion and a drivable portion, respectively.

20 Claims, 2 Drawing Sheets

DRIVE SYSTEM, DRIVE MODULE AND REARVIEW MIRROR UNIT FOR A MOTOR VEHICLE

CROSS-REFERENCE TO RELATED APPLICATION

This application is a national stage filing based upon International PCT Application No. PCT/NL2006/000528, with an international filing date of Oct. 18, 2006, which claims the benefit of priority to Netherlands Application No. 1030221, filed Oct. 18, 2005, each of which applications are fully incorporated herein by reference as though fully set forth herein.

TECHNICAL FIELD

The invention relates to a drive system, in particular for a driven angular adjustment of a rearview mirror support of a motor vehicle.

BACKGROUND

Such a drive system is known from practice and may, for instance, be used when the rearview mirror support has been placed in a position which is difficult to reach for the driver, or when it is desired to automatically adjust the rearview mirror support when the driver's seat is adjusted.

The known drive system comprises a central support provided with two electric motors, which is received between the mirror base, with which the rearview mirror support is attached to the roof or to the windscreen of the vehicle, and the mirror support plate, to which a mirror glass is attached. A disadvantage of this system is that it is relatively expensive and complex, and that it comprises relatively many components, a large part of which are specific to the drive system.

The invention contemplates a drive system, in particular for driven angular adjustment of a rearview mirror support of a motor vehicle which can be designed so as to be simpler and less expensive, while maintaining the advantages. In particular, the invention contemplates a drive system in which a lower number of application-specific parts can be used and whose structure can more easily be varied.

SUMMARY

Among other things, the invention provides a rearview mirror unit for a motor vehicle, the mirror unit comprising a mirror base and a rearview mirror support that are coupled through a modular drive system, so that the rearview mirror support can be adjusted with respect to the mirror base with two stacked driven rotational degrees of freedom, wherein the modular drive system, comprises at least two drive modules, each provided with a housing with an electric motor and a drive portion driven by the electric motor, and with a drivable portion for cooperation with a drive portion of another drive module, further comprises coupling means for attaching two drive modules to each other with one rotational degree of freedom by cooperation of a drive portion and a drivable portion, respectively.

By use of motorized drive modules each having a drive portion and a drivable portion which can be fixed to each other with the aid of coupling means, thereby realizing one driven rotation axis, a drive system can be realized having a simple and easily modifiable structure. The uncoupled drive portion of the two drive modules can be coupled with the rearview mirror support or the mirror base in order to realize a second driven rotation axis. A third driven rotation axis can be realized by coupling a still uncoupled drivable portion of one of the two modules with a drive portion of a third drive module.

The electric motor, the drive portion and an optional intermediate transmission mechanism can be built up from already available standard components. Only the housing of the drive module is specific to the system, but can be used in several drive modules and in several types of drive systems.

The housings of the drive modules preferably have substantially the same basic shape. What is thus achieved is that the housings may, for instance, be manufactured with one basic mold. By using, for instance, inserts and/or slides, with one mold, housing for the drive modules can be made which have the same basic shape, yet are not the same. However, with a view to the exchangeability of the modules, the housings of the drive modules are preferably substantially the same.

The drive portion and the drivable portion are preferably provided with a toothing. In particular, drive portion and drivable portion may be designed as a set of cooperating gear wheels or as a worm wheel cooperating with a worm. Of course, drivable portion and drive portion may also be designed in a different manner, for instance as a friction transmission or a conical gear wheel transmission. Further, a cooperating gear wheel may be designed as an internal toothing.

By coupling two drive modules with each other through a slip coupling, the drive modules can be rotated relative to each other under the influence of an external force without damage to a drive. Preferably, here, the slip coupling is provided between the motor and the drive portion in a drive module.

By providing a drive module with a positioning element, what can be achieved is that information about the relative angle between the drive modules or between a drive module and another element coupled therewith is available. Such position information can be used to adjust the drive module to a desired angular position, for instance an angular position of one adjusting axis of a rearview mirror support stored in a memory. By providing the positioning element between an optional slip coupling and a driven element in a drive module, what can be achieved is that the relative angular position also remains known when it is adjusted under the influence of an external force.

Preferably, the coupling means comprise receiving means integrated with the housing. What can thus is be achieved is that two drive modules or a drive module and a part driven thereby can be coupled to each other directly. Thus, the drive system can be simplified further and a compact, stable construction is realized. Of course, separate coupling means may also be provided, for instance a joint.

The receiving means preferably comprise a bearing bush for receiving a cylindrical portion, for instance a cylindrical portion of a drivable drive module or of another drivable part. By having the bearing bush engage around the cylindrical portion under a bias, friction is introduced. This friction stabilizes the mirror support against shocks resulting from movement of the vehicle. In another embodiment, this stabilization may also be obtained by a steel spring engaging around the bearing bush.

In the context of this patent application, drivable portion is understood to mean a portion of the drive module which is not driven through this drive module.

The coupling means preferably comprise snap fingers, so that a good locking between the parts can be realized, while maintaining quick mounting.

In an elegant manner, the bearing bush may be built up from a plurality of snap fingers enclosing a receiving space into which the drive portion reaches. In the receiving space, a drivable portion of a similar drive module or of a drivable part can be received. The drivable portion is, for instance, designed as an external gear provided near the edge of a cylindrical insert portion. The drive portion is, for instance, designed as a pinion having five or fewer teeth.

The invention further relates to a rearview mirror unit for a motor vehicle, comprising a mirror base and a rearview mirror support which are coupled through a modular drive system, so that the rearview mirror support can be adjusted with respect to the mirror base with two stacked driven rotational degrees of freedom.

The invention further relates to a drive module for a rearview-mirror unit comprising a housing with electric motor and a drive portion driven by the electric motor and a drivable portion for cooperation with a drive portion of a similar drive module and coupling means for coupling with a similar drive module with one rotational degree of freedom by cooperation of drive portion or driven portion.

Further advantageous embodiments of the invention are described in the subclaims.

BRIEF DESCRIPTION OF THE DRAWINGS

The invention will be explained in more detail with reference to an exemplary embodiment shown in a drawing, in which drawing.

DETAILED DESCRIPTION

Figure 1:
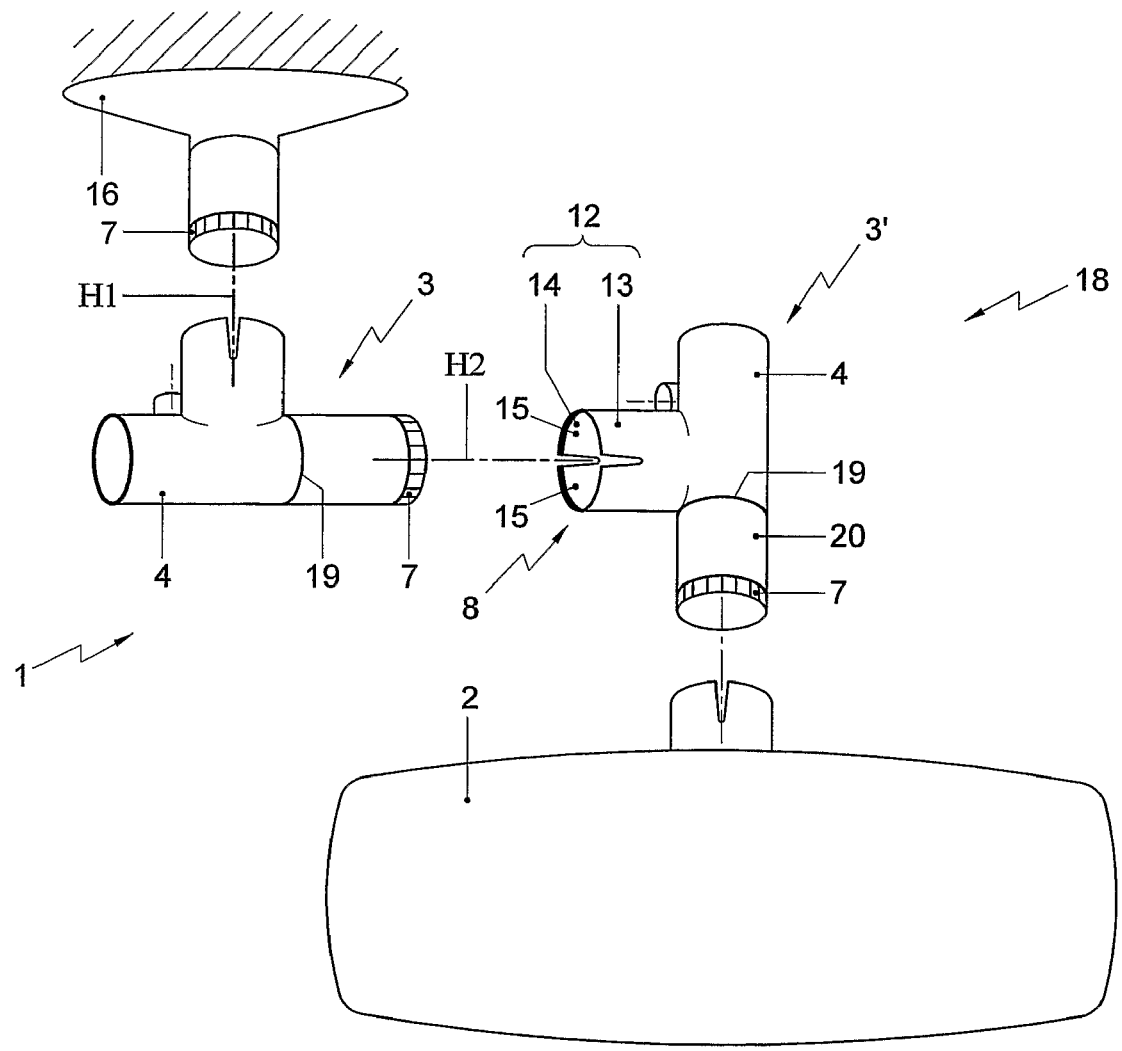
FIG. 1 shows a schematic perspective view of a modular drive system for driven angular adjustment of a rearview mirror support of a motor vehicle.

It is noted that the Figures are only schematic representations of preferred embodiments of the invention given by way of non-limiting exemplary embodiments. In the drawings, same or corresponding parts are designated by the same reference numerals.

With reference to FIG. 1, shown therein is a schematic perspective view of a modular drive system 1 for a driven angular adjustment of a rearview mirror support 2 of a motor vehicle. Here, the drive system 1 consists of two drive modules 3, 3'. Each drive module 3, 3' is provided with a housing 4 with an electric motor 5, as will be discussed hereinbelow with reference to FIG. 2. The electric motor 5 drives a drive portion 6 which can cooperate with a drivable portion 7 of another drive module 3'. The drive module 3, 3' has coupling means 8 for attaching two drive modules 3, 3' to each other with one rotational degree of freedom by cooperation of the drive portion 6 and a driven portion 7.

FIG. 1 shows two drive modules 3, 3' with substantially the same basic shape. In this exemplary embodiment, the drive modules 3, 3' are also substantially the same. This is to reduce the number of parts to be assembled, in order to design the module so as to be simpler and less expensive.

In the embodiment in FIG. 1, the rearview mirror support 2 is adjustable about two axes. The first drive module 3 is pivotal about a first axis H1. The second drive module 3' is pivotal about a second axis H2.

Figure 2:
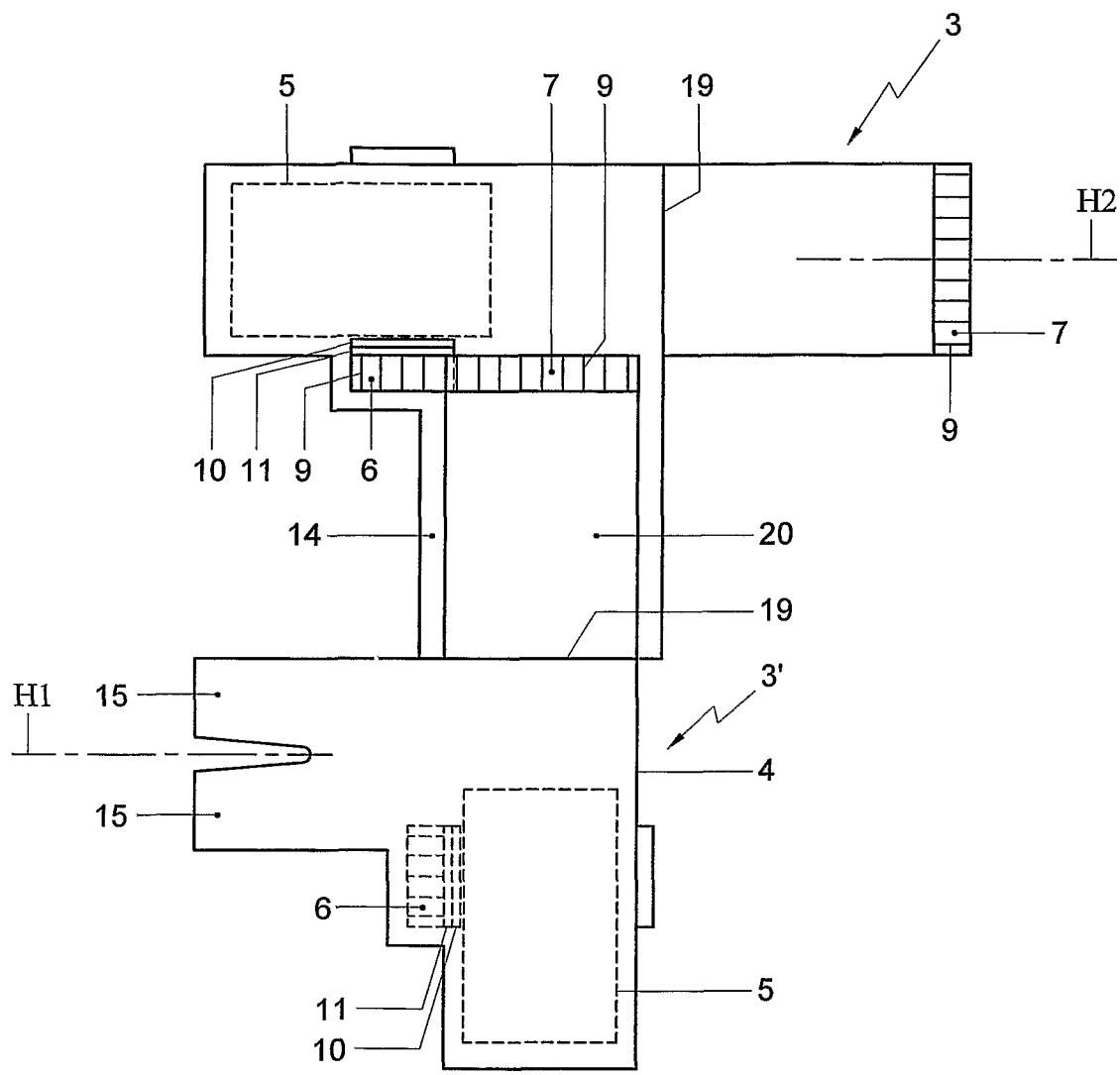
FIG. 2 shows a partly cross-sectional schematic view of two drive modules of FIG. 1 in coupled condition.

FIG. 2 shows a partly cross-sectional schematic view of two drive modules 3, 3' in coupled condition. The electric motor 5 with reduction mechanism is shown schematically and in dotted lines. In this embodiment, both the drive portion 6 and the drivable portion 7 are provided with a toothing 9. Here, the drive portion 6 and the drivable portion 7 are designed as gear wheels. The two drive modules 3, 3' are couplable through a slip coupling 10. With reference to FIG. 2, here, the slip coupling 10 is provided between the motor 5 and the drive portion 6.

In the exemplary embodiment shown in FIG. 2, the two drive modules 3, 3' are couplable through a positioning element 11. Here, the positioning element 11 is designed as a potentiometer and is located between the slip coupling 10 and the drive portion 6.

With reference to FIG. 1, the coupling means 8 are designed as receiving means 12 integrated with the housing 4. Here, these receiving means 12 consist of a bearing bush 13 for receiving a cylindrical portion. The bearing bush 13 encloses a receiving space 14. In coupled condition, the bearing bush 13 engages around the cylindrical portion under a bias. In coupled condition, this bias ensures the necessary stability. In this embodiment, the coupling means 8 are also provided with snap fingers 15. In this embodiment, the housing 4 is provided with a circular groove 19. Here, the snap fingers 15 cooperate with the groove 19.

With reference to FIG. 2, the drive portion 6 reaches into the receiving space 14. The drivable portion 7 is shaped to correspond with the receiving space 14. Here, this is realized by providing the drivable portion 7 with a cylindrical support portion 20 and by designing the receiving space 14 so as to be cylindrical, so that the drivable portion 7 can be received in the receiving space 14.

FIG. 1 shows the drive system 1 comprising a mirror base 16 and a rearview mirror support 2. In this exemplary embodiment, the mirror base 16 is provided with a drivable portion 7 shaped to cooperate with the drive portion 6 of a drive module 3, 3'. In another exemplary embodiment, not shown here, the rearview mirror support 2 may be provided with a drivable portion 7 shaped to cooperate with the drive portion 6 of a drive module 3, 3'. Or in a still further exemplary embodiment, not shown here, both the mirror base 16 and the rearview mirror support 2 may be provided with a drivable portion 7 shaped to cooperate with the drive portion 6 of a drive module 3, 3'.

In FIG. 1, the modular drive system 1 is part of a rearview mirror unit 18. The rearview mirror unit 18 comprises a mirror base 16 and a rearview mirror support 2 which are coupled through the drive system 1. The coupling is such that the rearview mirror support 2 is adjustable with respect to the mirror base 16 with two stacked driven rotational degrees of freedom. In this example, there is one rotational degree about the axis H1, and one rotational degree about the axis H2. The centerline H1 through the receiving space 14 is substantially at right angles to the centerline H2 of the drivable portion 7. The housing 4 of the drive module 3, 3' is substantially L-shaped or T-shaped.

In FIG. 1, the rearview mirror unit 18 has a mirror base 16 provided with a drivable portion 7 cooperating with a drive portion 6 of a drive module 3, 3'. In another exemplary embodiment, not shown here, the rearview mirror support 2 may be provided with a drivable portion 7 cooperating with a drive portion 6 of a drive module 3, 3'.

In again another embodiment, not shown here either, the rearview mirror unit 18 may be provided with three drive modules 3 coupled in series, so that the rearview mirror support 2 is adjustable with respect to the mirror base 16 with three stacked driven rotational degrees of freedom.

With reference to FIG. 1, the drive module 3, 3' is therefore suitable for a modular drive system 1. With reference to FIG. 2, the drive module 3, 3' comprises a housing 4 with an electric motor 5. The drive module 3, 3' further comprises a drive portion 6 driven by the electric motor 5 and a drivable portion 7 for cooperation with a drive portion 6 of a similar drive module 3, 3'. The drive module 3, 3' further comprises coupling means 8 for coupling with a similar drive module 3, 3' with one rotational degree of freedom by cooperation of drive portion 6 with a drivable portion 7.

The invention is not limited to the exemplary embodiment shown herein. Many variants are possible.

Such variants will be readily apparent to a skilled person and are understood to be within the scope of the invention as set forth in the following claims.

The invention claimed is:

1. A rearview mirror unit for a motor vehicle comprising:
a mirror base and a rearview mirror support that are coupled in connection with a modular drive system configured such that the rearview mirror support is adjustable with respect to the mirror base with two stacked driven rotational degrees of freedom,
wherein the modular drive system comprises at least two drive modules, each drive module provided with a housing having an electric motor and a drive portion driven by the electric motor, and a drivable portion for cooperation with a drive portion of another drive module, the unit further comprises a coupling configured to attach two drive modules to each other to provide a first driven rotation axis with one rotational degree of freedom by cooperation of a drive portion and a drivable portion, respectively; the at least two drive modules are coupled with the rearview mirror support or the mirror base to provide a second driven rotation axis and a second rotational degree of freedom; and the centerline of the first driven rotation axis and the centerline of the second driven rotation axis are angled to provide rotation in two different planes.

2. A rearview mirror unit according to claim 1, wherein the housings of the drive modules have substantially the same basic shape.

3. A rearview mirror unit according to claim 2, wherein the housings of the drive modules are substantially the same.

4. A rearview mirror unit according claim 1, wherein the drivable portion and the drive portion are provided with a toothing.

5. A rearview mirror unit according to claim 1, wherein the two drive modules are couplable via a slip coupling.

6. A rearview mirror unit according to claim 5, wherein the slip coupling is provided between the motor and the drive portion.

7. A rearview mirror unit according to claim 1, wherein the drive modules include a positioning element.

8. A rearview mirror unit according to claim 7, wherein the positioning element is provided between slip coupling and drive portion.

9. A rearview mirror unit according to claim 1, wherein the coupling means comprises a receiving means integrated with the housing.

10. A rearview mirror unit according to claim 9, wherein the receiving means comprises a bearing bush for receiving a cylindrical portion.

11. A rearview mirror unit according to claim 10, wherein, in coupled condition, the bearing bush engages around the cylindrical portion under a bias.

12. A rearview mirror unit according to claim 1, wherein the coupling means comprises snap fingers.

13. A rearview mirror unit according to claim 9, wherein the drive portion reaches into a receiving space enclosed by the receiving means and wherein the drivable portion is shaped to correspond with the receiving space.

14. A rearview mirror unit according to claim 1, wherein the housing of the drive module is substantially L-shaped or T-shaped, and the centerline of the first driven rotation axis is substantially at a right angle to the centerline of the second driven rotation axis.

15. A rearview mirror unit according to claim 14, wherein mirror base and/or rearview mirror support are provided with a drivable portion shaped to cooperate with the drive portion of a drive module.

16. A rearview mirror unit according to claim 1, wherein mirror base and/or mirror support are provided with a drivable portion cooperating with a drive portion of a drive module.

17. A rearview mirror unit according to claim 1, wherein three drive modules coupled in series are provided.

18. A rearview mirror unit according to claim 17, wherein the rearview mirror support is adjustable with respect to the mirror base with three stacked driven rotational degrees of freedom.

19. A drive module for connection with a second substantially similar drive module to form a rearview mirror unit, the drive module comprising:
a housing with an electric motor and a drive portion driven by the electric motor and a drivable portion, the drivable portion of the drive module configured for connection to and cooperation with a drive portion of said substantially similar second drive module, and
a coupling for attaching the drive module to said substantially similar second drive module;
whereby when the drive module is connected to the substantially similar second drive module one rotational degree of freedom is provided by cooperation of the drive portion of the substantially similar second drive module with the drivable portion of the drive module.

20. A drive module for a rearview mirror unit, comprising:
a first drive module including a housing with an electric motor and a drive portion driven by the electric motor and a drivable portion;
a second drive module that is substantially identical to the first drive module, the drivable portion of the first drive module configured for cooperation with a drive portion of the second drive module, and
a coupling for connecting the second drive module to provide a first driven rotational axis and one rotational degree of freedom by cooperation of the drive portion of the second drive module with the drivable portion of the first drive module;
and wherein the coupled first and second drive modules are configured to provide a second driven rotational axis and second rotational degree of freedom to a connected component, wherein a centerline of the first driven rotation axis is substantially at a right angle to a centerline of the second driven rotation axis.

* * * * *